United States Patent [19]

England et al.

[11] 4,079,329

[45] Mar. 14, 1978

[54] SIGNAL DEMODULATOR INCLUDING DATA NORMALIZATION

[75] Inventors: Jon D. England; James L. Snell, both of Melbourne, Fla.

[73] Assignee: Harris Corporation, Cleveland, Ohio

[21] Appl. No.: 740,787

[22] Filed: Nov. 11, 1976

[51] Int. Cl.[2] ........................................... H04L 27/22
[52] U.S. Cl. ...................................... 329/50; 325/320; 325/346; 325/347; 329/105; 329/122; 329/131; 331/25; 331/34; 331/177 R
[58] Field of Search ................. 329/50, 104, 105, 107, 329/122, 124, 125, 131–134; 325/320, 346, 347; 331/18, 25, 34, 177 R

[56] References Cited

U.S. PATENT DOCUMENTS

| 3,516,007 | 6/1970 | Bos et al. | 331/25 X |
| 3,971,996 | 7/1976 | Motley et al. | 329/50 X |
| 3,993,956 | 11/1976 | Gilmore et al. | 329/104 X |

Primary Examiner—Siegfried H. Grimm

[57] ABSTRACT

A digital demodulator for recovering a baseband signal from a selectable bit rate PSK modulated signal. Carrier recovery and bit timing recovery are accomplished by using the digital equivalent of an analog in phase-quadrature (I/Q) phase locked loop. The recovered I and Q components are directed through matched filters to remove unwanted out-of-band signal components. A normalization loop responds to the output of the filters to provide normalized signals whose amplitudes do not significantly vary with changes in data rate or signal to noise ratio. Circuitry is provided for tailoring the parameters of a loop filter used in the carrier recovery loop in accordance with the data rate of the incoming signal. A lock detector is provided for determining the signal-lock status of the demodulator, and for controlling the operation of a carrier sweep control. Several numerically controlled oscillators are disclosed for use in the carrier recovery and bit timing recovery loops.

15 Claims, 12 Drawing Figures

SIGNAL DEMODULATOR INCLUDING DATA NORMALIZATION

BACKGROUND AND FIELD OF THE INVENTION

The present invention relates to signal demodulators, and more particularly to selectable data rate, digital PSK demodulators.

PSK modulation techniques are widely used in digital signaling over RF communications channels. In digital phase shift keying (PSK) or digital phase modulation, digital information is communicated over the channel by sequentially transmitting carrier pulses of constant amplitude, angular frequency, and duration, but of different relative phase. In biphase PSK, two signals having a 180° relative phase difference between them are used to transmit one binary bit at a time. Demodulation of the PSK signal is accomplished by detecting the relative phase of the incoming signal and using the phase information thus obtained to determine the data content of the modulated signal.

Since different users of these communications channels often require different data rates, it is desirable to provide a PSK demodulator having sufficient flexibility to operate over a wide range of selectable data rates. Analog PSK demodulators currently in use generally require on-site calibration and periodic readjustment thereafter. These readjustment procedures are necessary to insure optimum performance of the demodulator since experience has shown that when analog units are not regularly adjusted, their operation tends to gradually deteriorate, often unnoticed, to the point where performance margins may be consumed and become unavailable when required.

Acquisition of the PSK signal in the first instance, and maintenance of signal lock following acquisition are also areas in which problems have previously been encountered.

The present invention overcomes these difficulties by providing a digital demodulator which can operate over a wide range of selected data rates without requiring either initial on-site adjustment or periodic readjustments thereafter. Further, the demodulator includes means for automatically acquiring the signal in the first instance, and for automatically reacquiring the signal should signal lock be broken. Several numerically controlled oscillators are also disclosed for use in this system.

In accordance with the present invention, a digital demodulator is disclosed which includes means for recovering a baseband signal from the modulated signal. The baseband signal is filtered through use of a matched filter to provide a soft data output. This output is multiplicatively combined with a normalization multiplier to provide a normalized data output. The normalization multiplier is derived by comparing the normalized data output with a selected threshold and increasing or decreasing the value of the multiplier in dependence upon the result of the comparison. Because of this normalization loop, the demodulator can accommodate a wide range of data rates without requiring extensive calibration.

In accordance with another aspect of the present invention, a carrier recovery loop is provided for a PSK demodulator which includes a lock detector for sensing when the signal has been acquired and when it has been lost. A carrier sweep control circuit responds to the output of the lock detector to cause a numerically controlled oscillator to sweep through a selected range of frequencies until the lock detector has sensed that the signal has been reacquired. The lock detector establishes this determination on the basis of several criteria: the amplitude of the data component of the incoming signal, indicated by the amplitude of the data normalization multiplier, must be greater than a threshold value; and the filtered and normalized in-phase component of the demodulated PSK signal must be greater by a selected amount than the filtered and normalized quadrature component of the demodulated PSK signal. A third criterion is established to insure that the demodulator does not falsely lock onto a bit-rate/2 frequency component.

In accordance with yet another aspect of the present invention, a numerically controlled oscillator is disclosed which includes accumulator means for accumulating control number at a substantially constant rate. The accumulator provides an overflow indication whenever the capacity of the accumulator is exceeded. Consequently, the rate at which overflow indications occur is dependent upon the magnitude of the control number supplied to the accumulator. An oscillator is thus produced whose frequency is numerically controlled.

BRIEF DESCRIPTION OF THE DRAWINGS

The foregoing and other objects and advantages of the present invention will become more readily apparent from the following description of the preferred embodiment as taken in conjunction with the accompanying drawings which are a part hereof and wherein.

DETAILED DESCRIPTION

Although the present invention will be described with reference to a PSK demodulator for demodulating biphase PSK signals, it will be appreciated that the principles embodied in the present invention have more general application to demodulation of other types of signals as well, for example, quadphase PSK.

Figure 1:
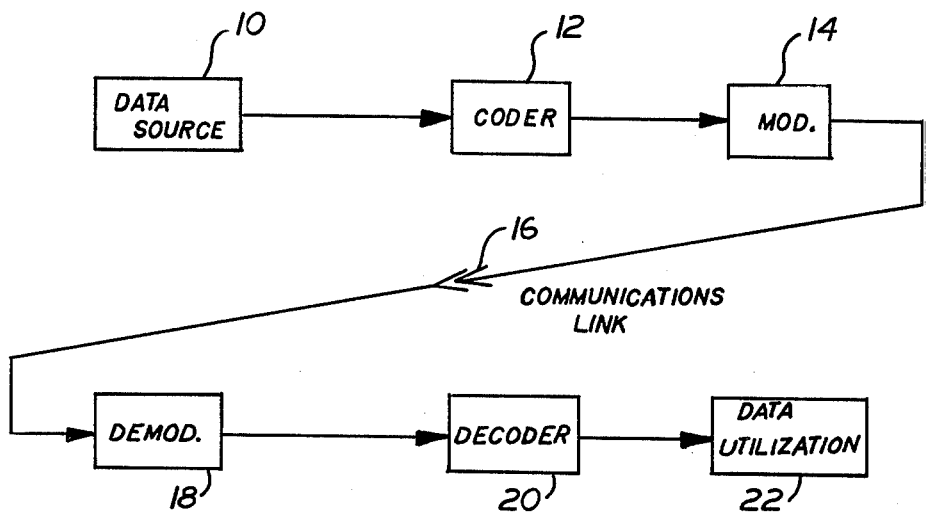
FIG. 1 is a general block diagram of a communication system of the sort in which the present invention may be used.

Referring first to FIG. 1, there is shown a communications link in which a demodulator in accordance with the present invention could conveniently find use. A data source 10 provides information signals to a coder 12 which encodes the information in any appropriate manner. Generally, a code will be chosen which will aid in the detection of errors in the subsequently received signal. A modulator 14 responds to the encoded signal to modulate an RF carrier frequency in accordance with well-known PSK techniques of transmission over a communications link 16. The signal is received by demodulator 18 which reduces the incoming signal to baseband and provides it to a decoder 20. Decoder 20 serves to reverse the algorithm provided by coder 12 to provide an error corrected output, hopefully corresponding to the information provided by data source 10, to a data utilization means 22. The present invention relates to the block identified in FIG. 1 as demodulator 18.

Figure 2:
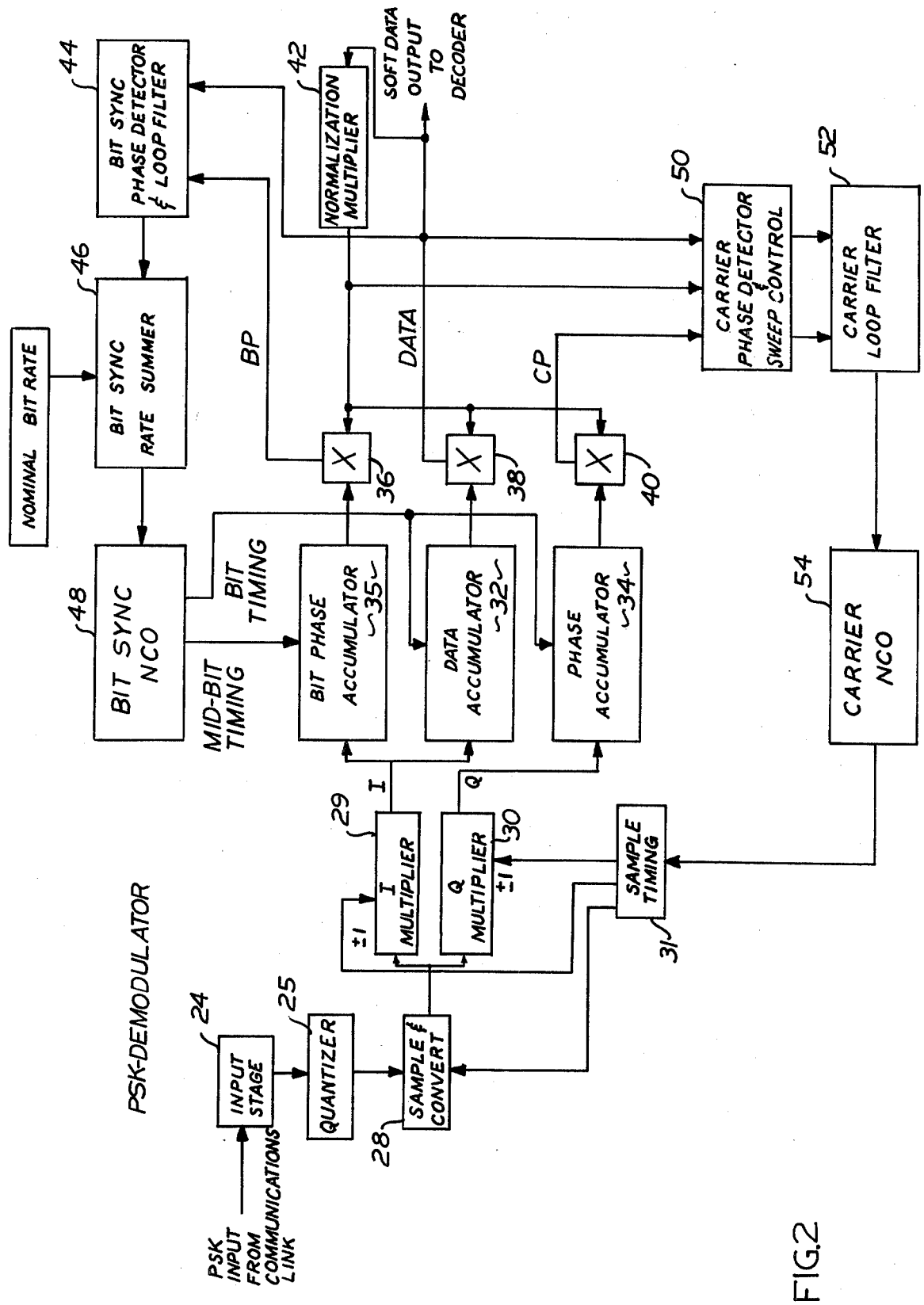
FIG. 2 is a block diagram of a PSK demodulator in accordance with the present invention.

Referring now to FIG. 2, a general block diagram of a PSK demodulator in accordance with the present invention is shown. The information received from the communications link 16 is directed to an input stage 24 which conditions the signal to provide an appropriate input to the quantizer 25. Input stage 24 will preferably include a down-conversion circuit for converting the RF input signal to an IF frequency, and may additionally include initial stages of gain as well as band filtering. Quantizer 25 responds to the analog IF signal provided by input stage 24 to produce a 7-bit, parallel word indicative of the changing amplitude of the IF signal. The quantizer output will vary at the IF rate in accordance with the sinusoidal variations in the amplitude of the IF signal.

Figure 3:
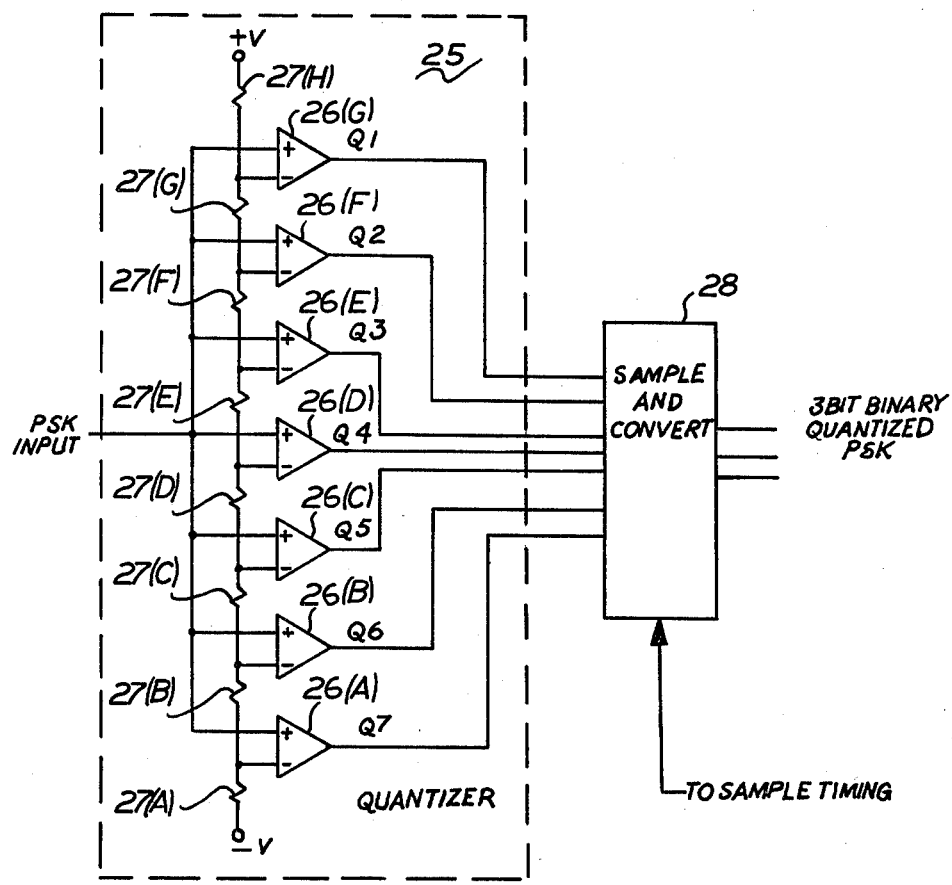
FIG. 3 is a schematic illustration of a preferred form of quantizer for use with the present invention.

As shown in FIG. 3, quantizer 25 may comprise seven comparators 26(a) – 26(g), each of conventional design, for comparing the PSK input signal against seven successively higher threshold voltages. These threshold voltage may be generated by a voltage divider consisting of eight resistors 27(a) – 27(h), connected in series between a positive voltage supply, +V, and a negative voltage supply, −V. The signals on the seven output lines may then be sampled and decoded by appropriate circuitry 28 to produce a three-bit binary word indicative of the amplitude of the PSK input signal at the time of sampling.

Figure 10:
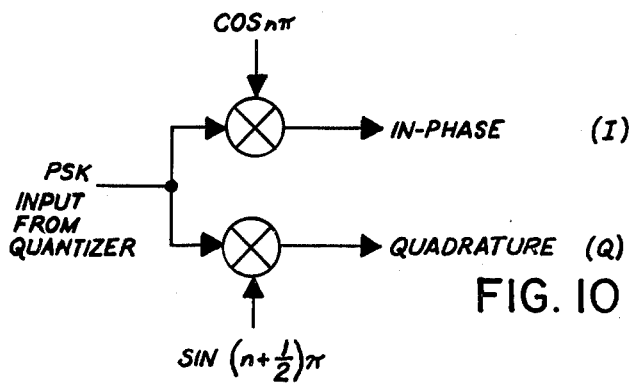

FIG. 10 provides a diagrammatic illustration of an analog PSK demodulator and may be referred to in order to promote an understanding of the relationship between the signals shown in FIGS. 4(A)–4(E).

A biphase PSK signal similar to the signal which would appear at the input to quantizer 25 is graphically depicted in FIG. 4(a). In the illustration, a first binary state is being transmitted during that time interval prior to time $t_7$, whereas a second binary state is being transmitted during that time interval following time $t_7$. This transition between binary states can be detected through coherent sampling of the incoming signal. Thus, if the PSK input signal is multiplied by the in-phase, coherent sampling function shown in FIG. 4(b), the baseband output shown in FIG. 4(d) will be produced. This baseband output, referred to hereinafter as the in-phase component (I), can then be processed to provide information regarding the data content of the PSK input signal.

In order to successfully accomplish the detection function outlined above, it is necessary to establish and then maintain the coherence of the sampling rate. This can be easily accomplished if the phase error between the sampling rate and the PSK input can be accurately measured. Phase errors can be detected by multiplying the input signal by a sampling function (shown in FIG. 4(c)) which is in phase quadrature with the sampling function shown in FIG. 4(b). The output shown in FIG. 4(e), referred to hereinafter as the quadrature-phase component (Q), will then result. If the in-phase sampling function is adjusted properly, the timing of the quadrature samples will be such that the Q component will be exactly zero. Any phase error between the sampling functions and the PSK input will manifest itself in the Q component as a small positive signal for one binary state of the input, and as a small negative signal for the other binary input state. By multiplying the I component by the Q component, a signal can be provided whose amplitude will only vary in dependence upon the phase error between the sampling signals and the PSK input. The dotted lines in FIGS. 3(d) and (e) outline the waveforms which would be produced if analog in-phase and quadrature multiplication were utilized. This general form of PSK demodulation is well-known in the art and forms no part of the present invention.

Figure 4:
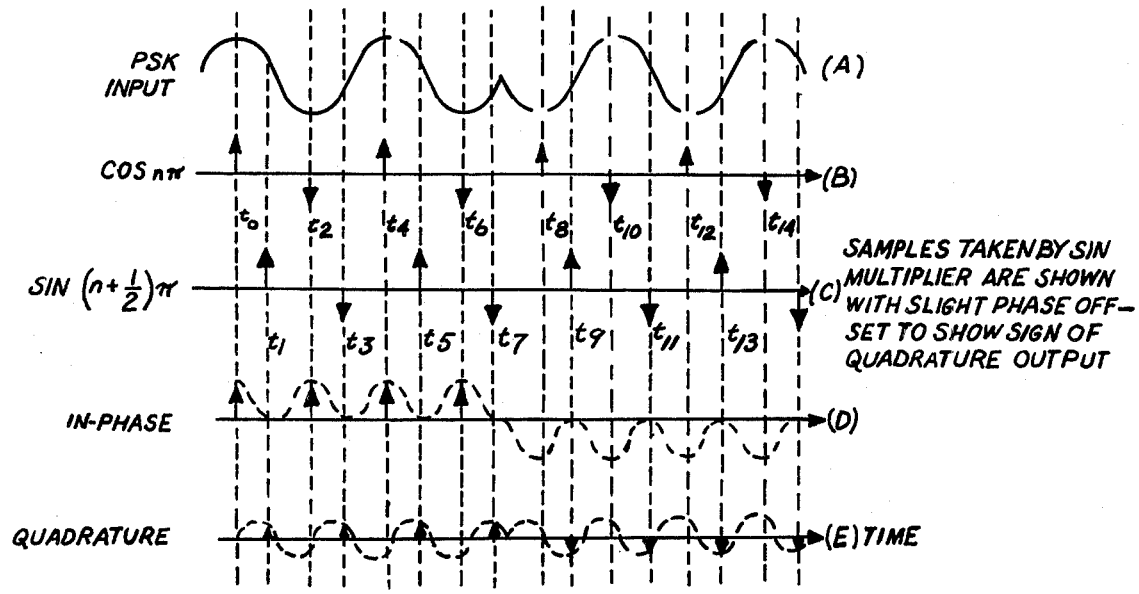
FIG. 4 is a diagrammatic illustration of the sampling scheme used for deriving the in-phase and quadrature components of the PSK signal.

Referring back to FIG. 2, demodulator 18 accomplishes the functions described in respect to FIG. 4 by first sampling the output of the quantizer 25 at four-times the IF rate and converting each quantized sample to a 3-bit binary word with a sample and convert circuit 28. The binary encoded samples are then assigned to the appropriate I or Q channel through use of I and Q multipliers 29 and 30, which respond to I and Q sampling functions provided by sample timing circuit 31. These circuits may be of conventional design and will not be described in further detail herein.

Figure 5:
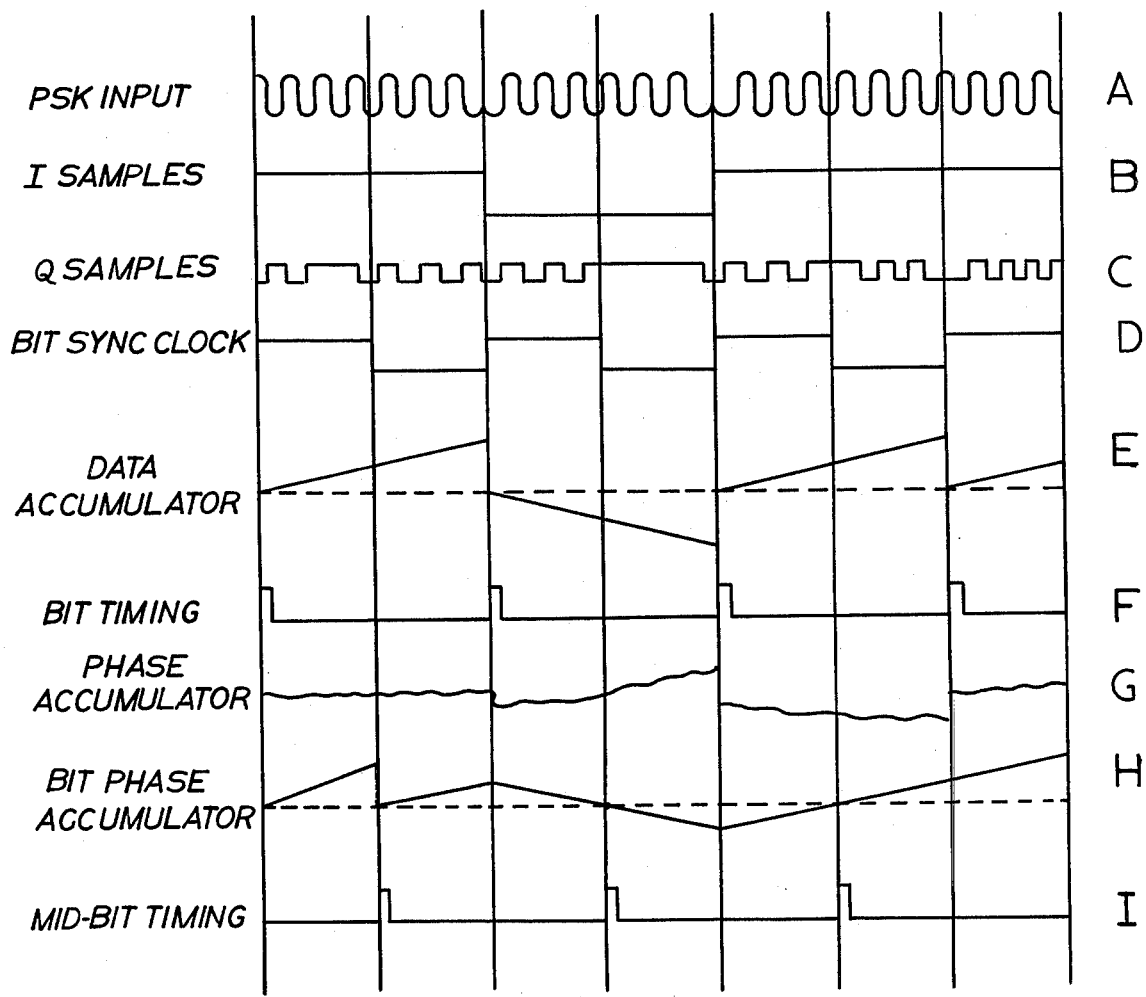
FIG. 5 is a diagrammatic illustration of the operation of the PSK demodulator of FIG. 2.

Because of the error corrupted nature of the I and Q samples so produced, it is desirable to provide filtering to remove the unwanted signal components. Matched filters 32 and 34 are included for this purpose. These circuits, which may conveniently comprise integrate and dump circuits, serve to accumulate the digital signals provided by the input multipliers over the symbol intervals. The accumulators are dumped (reset to zero) at the conclusion of each symbol interval. The frequency domain characteristics of these filters (sin X/X) closely match the frequency domain characteristic of the data content of the incoming signal. They therefore serve to significantly reduce undesirable out-of-band components. The operation of integrate and dump circuits 32 and 34 will be more readily understood with reference to the timing diagram of FIG. 5.

FIGS. 5(a), (b), and (c) respectively illustrate a PSK input signal and the I and Q components derived therefrom. The I samples in this case are shown in an idealized fashion, containing no error components. The data accumulator accumulates the I samples over each symbol interval to provide the signal shown in FIG. 5(e). Data accumulator 32 is dumped at the conclusion of each interval on the command of a bit timing signal shown in FIG. 5(f). The phase accumulator similarly accumulates Q samples over the bit interval and is dumped upon receipt of the same bit timing signal. Although the output of the accumulators is shown as analog in nature, it will be appreciated that this is only done for ease of illustration; the accumulators will preferably be digital in nature, having a digital output corresponding to the additive sum of the samples provided thereto.

In order to secure the advantages realized through use of the matched integrate and dump filters, it is necessary to have a bit timing signal which is synchronized with the symbol timing of the incoming signal. In pursuance of this goal, a third matched filter 35, referred to hereinafter as the bit phase accumulator, is included which integrates the I component shown in FIG. 5(b) over the interval extendng from the middle of one bit to the middle of the next bit. The resulting signal is illustrated in FIG. 5(h). Assuming the bit phase accumulator integrates the signal from exactly the middle of one bit to exactly the middle of the next bit, any transition that occurs in the incoming data will occur at exactly the midpoint of this interval. Consequently, if a data transition does occur, the output of the accumulator will be zero at the conclusion of that accumulating interval. The output of the bit phase accumulator at the conclusion of the accumulation interval thus represents a measure of the phase error in the bit sync clock during those times in which a transition has occurred during that accumulation interval. As with the carrier phase error signal, the output of the bit phase accumulator must be multiplied by the output of the data accumulator to produce a usable bit timing, phase error signal. The PSK demodulator described herein utilizes this phenomena to synchronize the operation of the bit sync clock, used to generate both the bit timing signals which reset the phase accumulator and data accumulator and the midbit timing signals which reset the bit phase accumulator, with the incoming signal.

Since samples are taken at a constant rate, the amplitude of the signals contained in the accumulator at the conclusion of the integrating interval will be directly related to the period of time over which the integral is taken. This, in turn, is related to the data rate of the incoming signal. Consequently, if the data rate is changed, the amplitudes of the signal provided by the three matched accumulators will change accordingly. Additionally, since the input stage 24 generally includes an AGC amplifier which cannot distinguish between signal and noise, any variation in signal to noise ratio will affect the amplitude of the output signals provided by the three accumulators.

According to the present invention, a normalization loop is included for compensating for these amplitude variations. Three multipliers, 36, 38, and 40, are provided which respond to a normalization multiplier provided by circuit 42 and to the signals provided by the bit phase accumulator 35, data accumulator 32, and phase accumulator 34 to provide respective normalized bit phase, data, and carrier phase signals.

Figure 6:
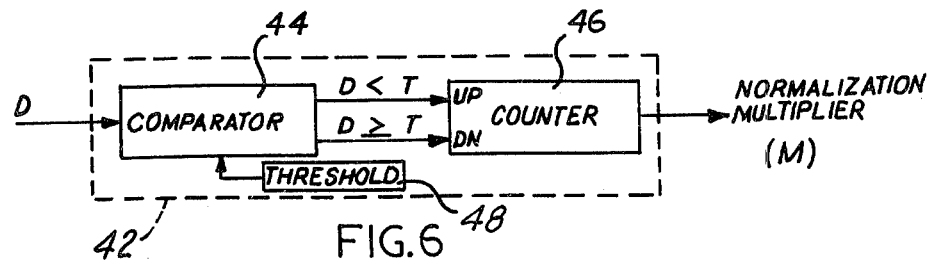
FIG. 6 is a block diagram of the circuit for generating the normalization multiplier in accordance with the present invention.

Referring to FIG. 6, a block diagram of normalization multiplier generator 42 is shown. Normalization multiplier 42 includes a comparator 44 and a counter 46. At the conclusion of each bit interval, the magnitude information of the data provided by multiplier 38 is compared in comparator 44 with a fixed threshold value 48. If the magnitude of the data signal (irrespective of sign) is smaller than this threshold signal, then the multiplier is increased by incrementing the count contained within the counter 46. If the magnitude of the data signal is greater than the threshold signal 48, then the count contained within counter 46 is decremented so as to decrease the value of the normalization multiplier. In this manner, a normalization multiplier M is generated which will vary so as to keep the average magnitude of data signal at the conclusion of each bit interval at approximately the threshold value.

The data signals provided at the output of multiplier 38 are then directed to the decoder for further processing. The data which is directed to the decoder may comprise merely polarity information if a nonerror detecting decoder is used, or may comprise of "soft" data signal which includes both amplitude information and polarity information, if an error detecting scheme has been employed. The carrier phase signal is directed to a carrier recovery loop, while the bit phase signal is directed to a bit sync loop. These loops provide the appropriate timing information for performing the functions described previously.

The bit timing recovery loop includes a bit sync phase detector 44 which detects the phase error between the locally generated bit timing, provided by a bit sync numerically controlled oscillator (NCO) and the symbol timing of the incoming signal. As described previously, the phase error signal is generated by multiplying the normalized bit phase signal provided by multiplier 36 times the normalized data signal provided by multiplier 38. This phase error signal is directed through a loop filter to provide the output of bit sync phase detector 44. This output is then additively combined with a nominal bit-rate signal set into a summing circuit 46 by the operator to provide a control signal for setting the operation of a bit sync NCO 48. Bit sync NCO 48 operates to provide a bit sync clock shown in FIG. 5(d) and to generate from this clock bit timing and midbit timing signals shown respectively in FIGS. 5(f) and 5(i).

The carrier recovery loop includes a carrier phase detector and sweep control 50 which responds to the normalized data and carrier phase signals as well as the normalization multiplier. The output of the carrier phase detector and sweep control is directed to a loop filter 52 which provides a control signal for the purpose of controlling the operation of a numerically controlled carrier oscillator 54. Carrier NCO 54 generates a signal having a repetition rate of four times the IF rate for use by sample timing circuit 31 for the purpose of generating the previously described sampling functions.

Figure 7:
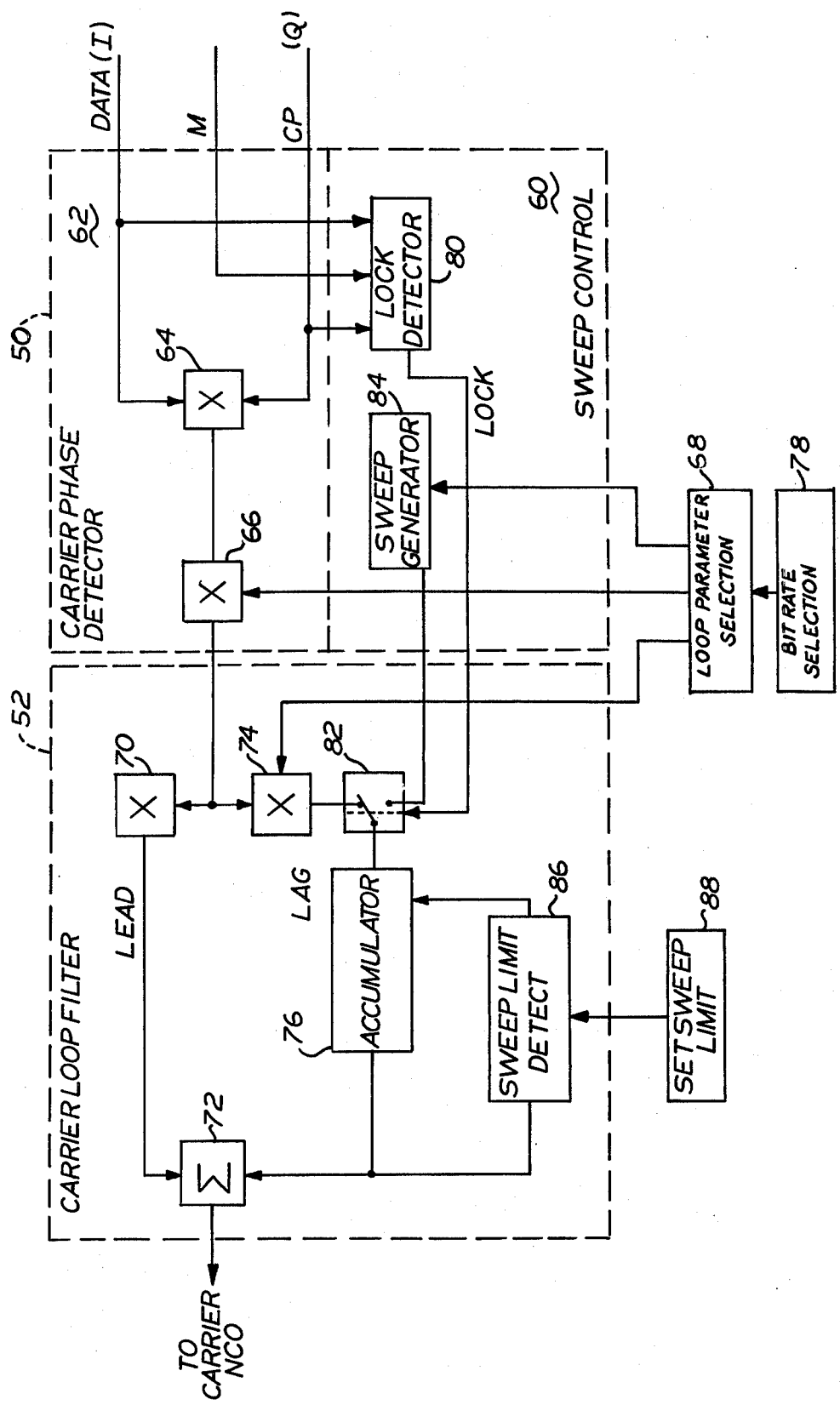
FIG. 7 is a more detailed block diagram of the carrier loop filter block and carrier phase detector and sweep control block of FIG. 2.

Referring now to FIG. 7, a more detailed block diagram of carrier phase detector and sweep control 50 and carrier loop filter 52 is shown. A sweep control 60 provides a controlling signal to carrier loop filter 46 prior to acquisition of the incoming signal. Following acquisition of the signal, carrier phase detector 62 is connected into the circuit and the sweep control 60 is disconnected.

Carrier phase detector 62 comprises a multiplier 64 for correlating the I and Q components of the incoming signal. As described previously, the result of this correlation process is a phase error signal which may be used to adjust the operation of the carrier recovery loop. This phase error signal is directed to a second multiplier 66 which serves to multiply the phase error signal by a signal supplied by a loop parameter selection circuit 68, to be described in further detail hereinafter. The results of this second multiplication are provided to the carrier loop filter 52.

Loop filter 52 comprises a digital lead-lag filter. The lead component of the signal is provided by a multiplier 70 which responds to the phase error signal provided by multiplier 66 to provide a signal, corresponding to a fixed multiple of the phase error signal, which is directed to a summing circuit 72. The lag component is provided by a second multiplier 74 which multiplies the phase error signal by a factor supplied by loop parameter selection circuit 68. An accumulator 76 serves to integrate the results of the multiplication, and provides the signal so produced to summing circuit 72. Summing circuit 72 serves to combine the lead component and lag component to provide a control number, corresponding to the sum of the two components to carrier NCO 54. The relative contribution of the lead and lag signals will vary in accordance with the difference between the multipliers used in multipliers 70 and 74. In accordance with the present invention, this ratio is controlled by varying the multiplier supplied to multiplication circuit 74 and by varying the loop gain by controlling the multiplier supplied to multiplication circuit 66. In a preferred embodiment, these factors are controlled by a loop parameter selection circuit 68 which provides selected multipliers so as to tailor the response of the loop filter to the bit rate then in use. Loop parameter selection circuit 68 may comprise a standard read-only memory which has been programmed to provide the desired output signals. Loop parameters selection circuit 68 is addressed by a bit-rate selection circuit 78 which may be manually controlled. Prior to operation, the operator will set a value in bit-rate selection circuit 78 which corresponds to the known bit rate of the received signal. This value will address loop parameter selection circuit 68 to provide appropriate loop parameters for the bit-rate which has been selected.

A loop detector circuit 80 is provided for determining when the carrier and bit timing signals provided by the PSK demodulator are synchronized with the carrier and bit timing of the received signal. This lock detector will be described in greater detail with reference to FIG. 8. The output of lock detector 80, indicative of the lock status of the PSK demodulator, is directed to an analog switch 82 in the carrier loop filter 52 (characterized as the manual switch for purposes of discussion). Switch 82 is normally positioned so that the input of lag term accumulator 76 is connected to the output of multiplier 74. When lock detector 80 has determined that an out-of-lock condition exists, a signal is provided which causes switch 82 to connect the output of sweep generator 84 to the lag accumulator 76. Sweep generator 84 produces a digital signal which is accumulated at a constant rate by accumulator 76 so as to cause an output thereof to change at a linear rate. This output, which is directed through summing circuit 72 to the carrier NCO 54, thus causes the carrier oscillator to sweep through a range of frequencies at a constant rate. When the lock detector has determined that lock has once again been achieved, switch 82 is returned to its initial state, thereby reconnecting lag accumulator 76 to the output of multiplier 74.

Since the carrier frequency will be known to lie within a certain, rather narrow, range of frequencies, it is unnecessary to cause the numerically controlled oscillator to sweep through frequencies outside of this range. A sweep limit detector 86 is therefore included to sense when the output of accumulator 76 has reached the value corresponding to the limiting frequency of the range in which the carrier frequency lies. Upon detecting this, sweep limit detector 86 will reset accumulator 76 to the value corresponding to the limit at the opposite end of the range of frequencies. The accumulator will again sweep through the range of frequencies and will then, again, be reset by the sweep limit detector. The sweep limit may be set in by the operator through use of an appropriate input device, such as a thumbwheel switch, shown in FIG. 7 as the block labeled "set sweep limit," identified by reference numeral 88.

Figure 8:
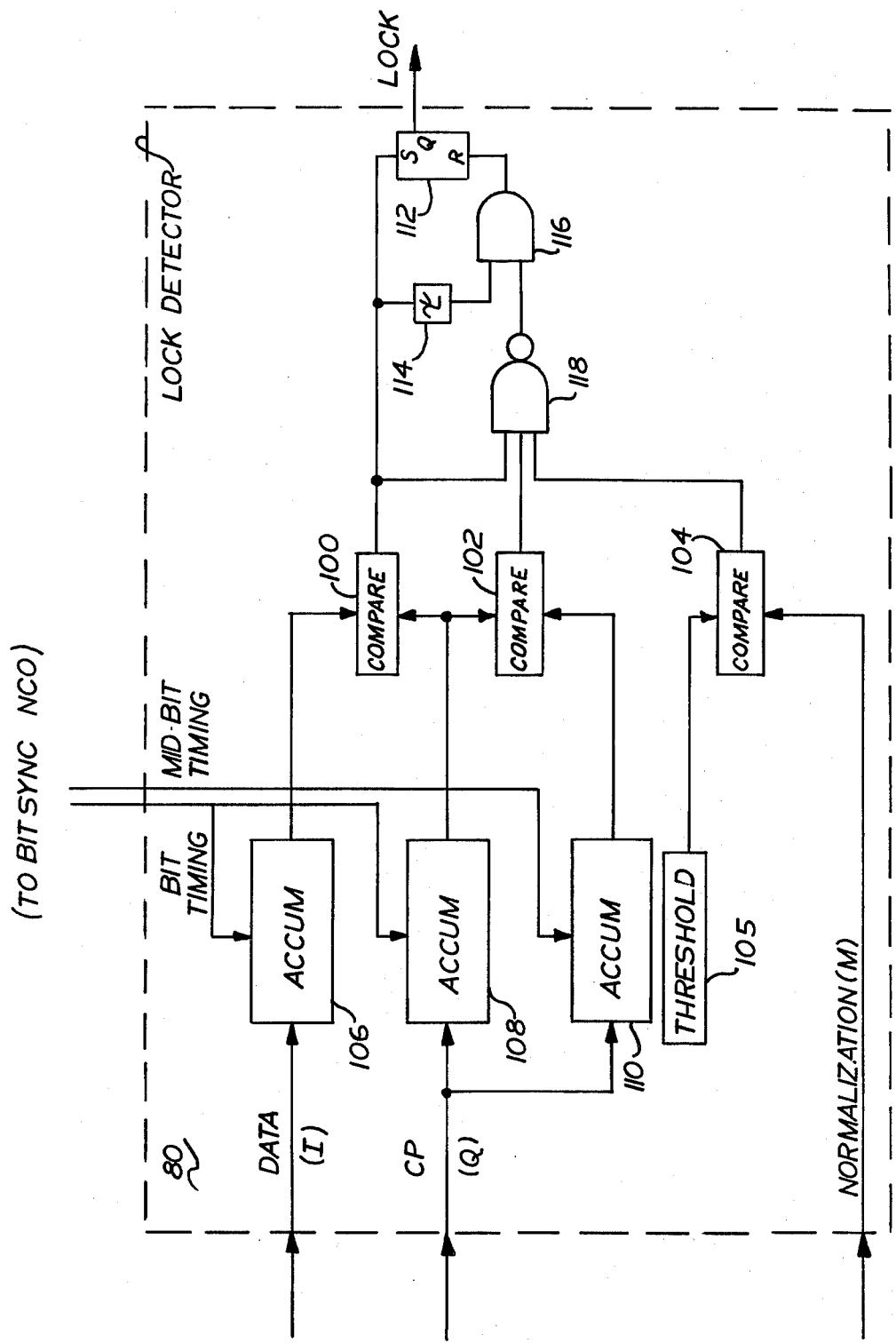
FIG. 8 is a more detailed block diagram of a lock detector in accordance with the present invention.

The lock detector 80 used in the sweep control 60 of FIG. 7 is shown in greater detail in FIG. 8. The existence of a lock condition is determined on the basis of three conditions represented by the outputs of comparators 100, 102, and 104. From FIG. 4 it will be seen that when the signals are properly locked in synchronism, the I component represented by the output of the data accumulator will be much greater than the Q component represented by the output of the phase accumulator. This difference will be most pronounced at the end of each bit interval. Consequently, an indication of the lock condition of the system can be provided by comparing the outputs of the data and phase accumulators at the conclusion of each bit interval. Accumulators 106 and 108 are strobed by the bit timing signal so as to integrate the end-bit I and Q components, respectively. The outputs thereof indicate when each accumulator has overflowed. If a lock condition exists, accumulator 106 will always overflow first. If accumulator 108 should overflow first, the output of comparator 100 will shift from a high state to a low state, and an out-of-lock condition will be declared. If accumulator 106 should overflow first, both accumulators will be reset and the output of comparator 100 will remain in a high state. Preferably, accumulator 108 will be preloaded with a selected number so as to give it a head start over accumulator 106. This will insure that accumulator 106 will only overflow first if the I component is significantly greater than the Q component.

A second indication can be obtained by examining the amplitude of the normalization multiplier. When the demodulator is properly locked in synchronism with the incoming signal, the normalization multiplier will hopefully be somewhat small. If the normalization multiplier becomes unduly large, indicating that the gain in the normalization loop is quite high, and, hence, that the data content of the incoming signal is quite small, then it can be inferred that the signal has been lost. This is implemented in the present invention by comparing the normalization multiplier against a fixed threshold 105 in a comparator 104.

A third indication must be provided due to the tendency of the demodulator to lock onto the bit-rate/2 harmonic. The existence of this false-lock condition can be detected by comparing the contents of the phase accumulator at the middle and end of each bit interval. If the demodulator is locked onto the bit-rate/2 harmonic, a beat frequency will exist on the carrier phase accumulator output. Since this beat signal is synchronized with the bit timing, it cannot be detected by the first condition represented by accumulators 106, 108, and comparator 100. This is because the zero crossings of the beat signal may exactly coincide with the bit timing signal. In this event, however, the contents of the phase accumulator at the middle of the bit interval will be significantly greater than the contents of the phase accumulator at the conclusion of each bit interval. This condition is sensed in the present invention by providing a third accumulator 110 which also responds to the output of the phase accumulator and is clocked by a midbit timing signal so as to accumulate the contents of the phase accumulator at the center of each bit interval. The outputs of accumulators 108 and 110 are then compared by a third comparator 102.

An RS flip-flop 112 is provided in lock detector 80 which responds to the status of comparators 100, 102, and 104 to provide a hard decision regarding the presence or absence of a signal lock condition. During signal acquisition, the presence of a lock condition is defined as occurring when the outputs of all three comparators are at a high (digital "1") state. Prior to signal lock, flip-flop 112 will be at a reset condition, with its output being in a low state. Also, the output of comparator 100 and possibly comparators 102 and 104, will also be in low states. Consequently, flip-flop 112 will remain in the reset condition until comparator 100 returns to a high level. When comparator 100 does so return to a high level, flip-flop 112 will be set and the Q output thereof will go to a digital "1" state, indicating that a conditional lock has been achieved. Since it takes longer for the other two comparator loops to settle out, it is desirable that the reset input leg to flip-flop 112 should remain disabled for some time period after conditional lock has occurred. A time delay 14 and an AND gate 116 are included for this purpose. Following the time delay set in time delay circuit 114, the output thereof will go to a high state, thus enabling gate 116. If, at this time, the output of one or both comparators 102 or 104 are still in a low state, the output of AND gate 118 will be in a digital "1" state. Consequently, the output of gate 116 will also be high and flip-flop 112 will be reset. (It is assumed for purposes of the present discussion that flip-flop 112 has a priority reset function.) If, however, signal lock has in fact been achieved, then the output of comparators 102 and 104 will both be in a high state, thus causing the output of 118 to be in a low state. This, in turn, means that the output of gate 116 will also be low and flip-flop 112 will remain in the set condition.

If, for any reason, signal lock should accidently be lost, the output of one of the comparators will return to a low state. This will cause lock flip-flop 112 to reset, thus indicating that lock has been broken. The sweep control loop of the demodulator will then be enabled until lock has been reacquired in the manner outlined above.

Figure 9:
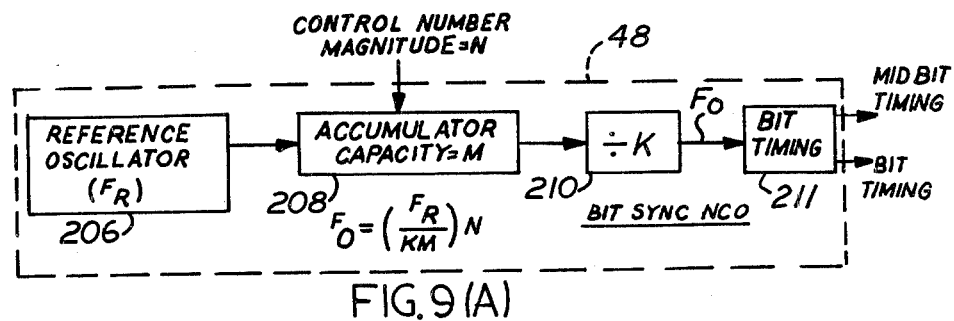
FIG. 9(a), (b), and (c) are block diagrams of preferred forms of numerically controlled oscillators for use in the present invention; and, FIG. 10 is a diagram useful in understanding the relationship between the signals of FIGS. 4(A) to 4(E).
Figure 9:
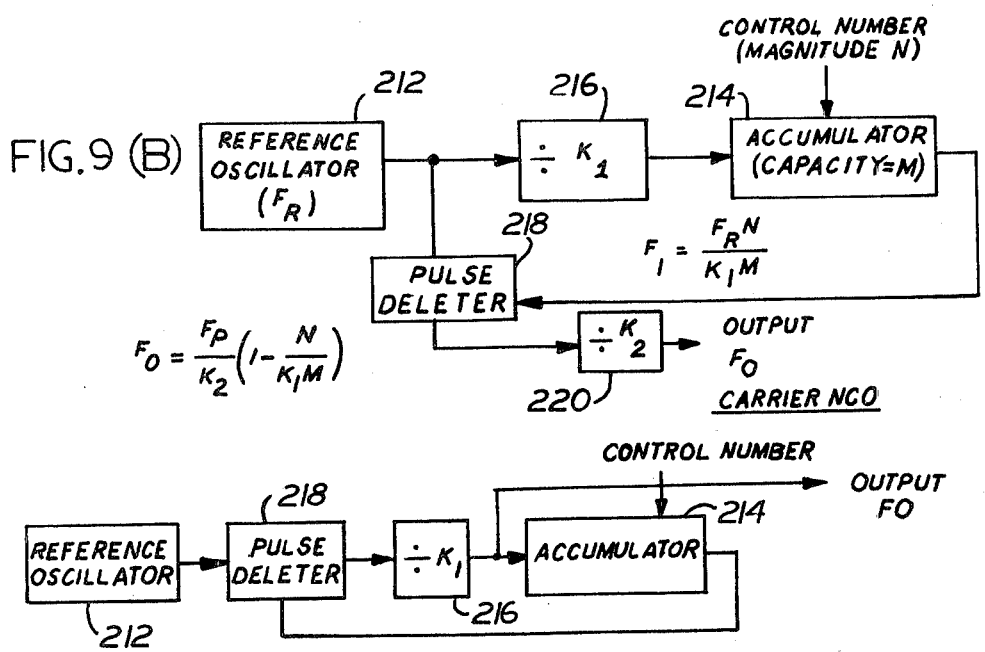

FIGS. 9(a), (b), and (c) illustrate in blocked diagrammatic form the numerically controlled oscillators used in the present invention. Referring first to FIG. 9(a), the bit sync NCO will be described. The bit sync NCO 48 comprises a reference oscillator 206, a digital accumulator 208, and a divide-by-K circuit 210. Reference oscillator 206 provides a timing signal which controls the operation of the accumulator 208. With each pulse supplied by reference oscillator 206, accumulator 208 serves to additively combine a control number which is supplied thereto with the number already contained therein. When accumulator 208 overflows as a result of accumulating a number too large (or too small) to be contained therein, a pulse is applied to the divide-by-K circuit 210. Divide-by-K circuit 210 is included for the purpose of smoothing the pulse repetition rate. The output of accumulator 208 is somewhat irregular since it is not reset to the same value at the occurrence of each overflow. Rather, following an overflow, the accumulator will contain a value corresponding to the value it would have contained if the capacity of the accumulator had been adequate to accommodate it, minus a number corresponding to the actual capacity of the accumulator. Since this remainder value will vary, the time required for the accumulator 208 to overflow may also vary to some degree. The amount of time required for the accumulator 208 to overflow is, however, directly related to the control number which is applied thereto, consequently, the output frequency may be controlled by varying the control number. In the bit sync recovery loop, this control number is supplied by the bit sync rate summer 46. The bit sync clock provided at the output of divide-by-K circuit 210 is directed to a bit timing circuit 211 which provides a bit timing pulse on each rising edge of the clock signal, and a mid-bit timing pulse on each falling edge of the clock signal.

Referring now to FIG. 9(b), a numerically controlled oscillator for use in a carrier recovery loop is shown. Since a high rate oscillator is necessary for the carrier recovery loop, a somewhat different scheme will preferably be employed so that a low rate accumulator can be used. The NCO shown in FIG. 9(b) still requires a relatively high rate reference oscillator 212, but can use a somewhat less sophisticated accumulator 214 because of the presence of a prescaler 216. Prescaler 216 serves to divide the frequency provided by the reference oscillator 212 so as to cause accumulator 214 to accumulate at a rate which is significantly lower than the rate provided by reference oscillator 212. The overflow of accumulator 214 causes a pulse deleter 218 to delete one of the pulses in the pulse train provided by reference oscillator 212. Again, a prescaler 220 is used to smooth the repetition rate of the pulse train provided by the output of pulse deleter 218. If, as shown in FIG. 9(c), the pulse deleter 218 is instead inserted between reference oscillator 212 and prescaler 216, a second prescaler is unnecessary. The output may then be taken from the output of prescaler 216. Although the functional relation between the control number and the output frequency is somewhat more complex, the operation of the circuits of FIGS. 9(b) and (c) are substantially the same.

In summary, then, a variable bit-rate digital PSK demodulator has been disclosed which can be operated at a selectable data rate. This PSK demodulator includes a carrier recovery loop which can automatically acquire the communications signals in the first instance, and can maintain an accurate signal lock thereafter. In addition, a carrier lock detector has been disclosed which can accurately determine whether a signal lock condition exists. A normalization loop has been included which normalizes the output of matched filters so as to enable the PSK demodulator to be operated at arbitrary data rates. Several numerically controlled oscillators have been disclosed which can be used in the disclosed application.

Although the invention has been described with respect to a preferred embodiment, it will be understood that a large number of alterations and arrangement of parts may be made without departing from the spirit and scope of the invention and defined in the appended claims.

What is claimed is:

1. Apparatus for demodulating a signal which has been modulated at a signaling rate in accordance with digital information comprising:
   means adapted to respond to said signal for recovering a baseband signal therefrom;
   matched filter means responsive to said baseband signal for providing a filtered baseband signal; and,
   normalization means responsive to said filtered baseband signal for normalizing the magnitude thereof to provide a normalized output signal having a substantially constant average magnitude, whereby variations in magnitude of said filtered baseband signal, whether arising from variations in said signaling rate or otherwise, do not substantially effect said normalized output.

2. Apparatus as set forth in claim 1 wherein said normalization means comprises multiplier means responsive to said filtered baseband signal and to a normalization multiplier for providing a normalized output signal corresponding to the multiplicative combination of said filtered baseband signal and said multiplier, and means responsive to said normalized output for providing said multiplier and for changing said multiplier in response to changes in the magnitude of said normalized output.

3. Apparatus as set forth in claim 2 wherein said matched filter means comprises means for integrating said baseband signal and means for periodically resetting said integrating means in synchronism with said signaling rate.

4. Apparatus for demodulating a PSK modulated signal comprising:
    means responsive to said PSK modulated signal and to a coherent, in-phase reference signal for providing a first output signal corresponding to the multiplicative combination of said reference signal and said modulated signal;
    means responsive to said PSK modulated signal and to a coherent, quadrature-phase reference signal for providing a second output signal corresponding to the multiplicative combination of said reference signal and said modulated signal;
    matched filter means responsive to said first and second output signals for providing first and second filtered output signals;
    normalization means responsive to said first and second filtered output signals for normalizing said signals to provide first and second normalized output signals;
    phase detector means for multiplicatively combining said first and second normalized output signals to provide a phase error signal; and,
    oscillator means for providing said in-phase and quadrature-phase reference signals and responsive to said phase error signal for correcting the timing therof.

5. Apparatus as set forth in claim 4 wherein said normalization means comprises first multiplier means responsive to said first filtered output and to a normalization multiplier for providing a first normalized output signal corresponding to the multiplicative combination of said normalization multiplier and said first filtered output, second multiplier means responsive to said second filtered output and to said normalization multiplier for providing a second normalized output signal corresponding to the multiplicative combination of said normalization multiplier and said second filtered output, and means responsive to said first normalized output signal for providing said normalization multiplier and for changing said multiplier in response to changes in the magnitude of said first normalized output signal.

6. Apparatus as set forth in claim 4 wherein said matched filter means comprises means for integrating said first output signal to provide said first filtered output signal, means for integrating said second output signal to provide said second filtered output signal, and means for periodically resetting both said integrating means in synchronism with the signaling rate of said PSK modulated signal.

7. Apparatus for demodulating a PSK modulated signal comprising:
    means responsive to said PSK modulated signal and to a coherent, in-phase reference signal for providing a first output signal corresponding to the multiplicative combination of said reference signal and said modulated signal;
    means responsive to said PSK modulated signal and to a coherent, quadrature-phase reference signal for providing a second output signal corresponding to the multiplicative combination of said reference signal and said modulated signal;
    matched filter means responsive to said first and second output signals for providing first and second filtered output signals;
    normalization means responsive to said first and second filtered output signals for normalizing said signals to provide first and second normalized output signals;
    phase detector means for multiplicatively combining said first and second normalized output signals to provide a phase error signal; and,
    oscillator means for providing said in-phase and quadrature-phase reference signals and responsive to said phase error signal for correcting the timing thereof, said oscillator means comprising loop filter means responsive to said reference phase error signal for providing a control number and for increasing or decreasing said control number in dependence upon the value of said reference phase error signal, numerically controlled oscillator means responsive to said control number for providing a clock pulse train having a repetition rate which is directly related to said control number, and sample timing means responsive to said clock pulse train for providing said in-phase and quadrature-phase reference signals.

8. Apparatus as set forth in claim 7 and further comprising means for providing a signal indicative of the signalling rate of said PSK modulated signal, and loop filter conditioning means responsive to said signal indicative of said signaling rate for tailoring the parameters of said loop filter in accordance therewith.

9. Apparatus as set forth in claim 7 wherein said numerically controlled oscillator means comprises:
    reference oscillator means for providing a first pulse train having a constant repetition rate;
    accumulator means having an accumulated number contained therein, for periodically changing said accumulated number by the amount of said control number and for providing an overflow indication whenever the capacity of said accumulator means is exceeded, and wherein said periodic changes occur at a rate determined by the rate at which pulses are supplied to a count control input of said accumulator means;
    means responsive to said first pulse train for supplying pulses to said count control input of said accumulator means; and,
    means responsive to said overflow indications for providing said clock pulse train having a repetition rate which is substantially related to the rate at which said overflow indications occur whereby said repetition rate of said clock pulse train will be directly related to said control number supplied to said numerically controlled oscillator means.

10. Apparatus as set forth in claim 9 wherein said means responsive to said overflow indications comprises:
    pulse deleter means responsive to said first pulse train and to said overflow indications for providing an output pulse train corresponding to said first pulse train but where pulses have been deleted upon the occurrence of each said overflow indication such that the repetition rate of said output pulse train is dependent upon the rate of occurrence of said overflow indications; and, prescaler means responsive to said output pulse train for providing said second pulse train at a rate fractionally related to the mean repetition rate of said output pulse train.

11. Apparatus as set forth in claim 7 wherein said normalization means comprises first multiplier means responsive to said first filtered output and to a normalization multiplier for providing a first normalized output signal corresponding to the multiplicative combination of said normalization multiplier and said first filtered output, second multiplier means responsive to said second filtered output and to said normalization multiplier for providing a second normalized output signal corresponding to the multiplicative combination of said normalization multiplier and said second filtered output, and means responsive to said first normalized output signal for providing said normalization multiplier and for changing said multiplier in response to changes in the magnitude of said first normalized output signal.

12. Apparatus as set forth in claim 11 and further comprising:
lock detector means responsive to said first and second filtered outputs and to said normalization multiplier for providing a lock signal indicative of the signal-lock status of said demodulating apparatus; and,
sweep control means responsive to said lock signal for causing said numerically controlled oscillator means to sweep through a selected range of clock repetition rates until said lock signal indicates that a lock condition has been established.

13. Apparatus as set forth in claim 12 wherein said lock detector means comprises:
first condition means responsive to said first and second filtered outputs for comparing the amplitudes thereof and for providing a first condition signal whenever said first filtered output is more than a selected amount greater than said second filtered output;
second condition means responsive to said normalization multiplier for providing a second condition signal whenever said normalization multiplier is smaller than a selected threshold value; and,
means responsive to said first and second condition signals for providing a lock signal indicative of a lock condition when both said first and second condition signals exist, and for providing a lock signal indicative of the absence of a lock condition otherwise.

14. Apparatus as set forth in claim 12 wherein said lock detector means comprises:
first condition means responsive to said first and second filtered outputs for comparing the amplitudes thereof and for providing a first condition signal whenever said first filtered output is more than a selected amount greater than said second filtered output;
second condition means responsive to said normalization multiplier for providing a second condition signal whenever said normalization multiplier is smaller than a selected threshold value;
third condition means responsive to said second filtered output for detecting the presence of a bit-rate/2 beat note thereon and for providing a third condition signal in the absence thereof; and,
means responsive to said first, second, and third condition signals for providing a lock signal indicative of a lock condition when all said first, second, and third condition signals exist, and for providing a lock signal indicative of the absence of a lock condition otherwise.

15. Numerically controlled oscillator means comprising:
reference oscillator means for providing a first pulse train having a constant repetition rate;
accumulator means adapted to respond to a control number and having an accumulated number contained therein, for periodically changing said accumulated number by the amount of said control number and for providing an overflow indication whenever the capacity of said accumulator means is exeeeded, and wherein said periodic changes occur at a rate determined by the rate at which pulses are supplied to a count control input of said accumulator means;
means responsive to said first pulse train for supplying pulses to said count control input of said accumulator means;
pulse deleter means responsive to said first pulse train and to said overflow indications for providing an output pulse train corresponding generally to said first pulse train but having a pulse deleted therefrom upon the occurrence of each of said overflow indications; and,
pulse divider means responsive to said output pulse train for dividing said pulse train by an integer N so as to provide a clock pulse train having a repetition rate which varies with said control number.

* * * * *